(12) United States Patent
Kaltenbach et al.

(10) Patent No.: US 12,122,242 B2
(45) Date of Patent: Oct. 22, 2024

(54) HYBRID TRANSMISSION DEVICE, ENGINE TRANSMISSION ARRANGEMENT, HYBRID DRIVETRAIN AND MOTOR VEHICLE

(71) Applicant: ZF Friedrichshafen AG, Friedrichshafen (DE)

(72) Inventors: Johannes Kaltenbach, Friedrichshafen (DE); Martin Brehmer, Tettnang (DE); Max Bachmann, Friedrichshafen (DE); Peter Ziemer, Tettnang (DE); Stefan Beck, Eriskirch (DE); Michael Wechs, Weißensberg (DE); Matthias Horn, Tettnang (DE); Fabian Kutter, Kressbronn (DE); Oliver Bayer, Hörbranz (AT); Thomas Kroh, Lindau (DE); Thomas Martin, Weissenberg (DE); Reinhard Vollmar, Ravensburg (DE); Juri Pawlakowitsch, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 142 days.

(21) Appl. No.: 17/604,628

(22) PCT Filed: Apr. 15, 2020

(86) PCT No.: PCT/EP2020/060530
§ 371 (c)(1),
(2) Date: Oct. 18, 2021

(87) PCT Pub. No.: WO2020/212386
PCT Pub. Date: Oct. 22, 2020

(65) Prior Publication Data
US 2022/0194208 A1    Jun. 23, 2022

(30) Foreign Application Priority Data
Apr. 16, 2019    (DE) .......................... 102019205510.9

(51) Int. Cl.
*B60K 6/547*    (2007.10)
*B60K 6/36*    (2007.10)
(Continued)

(52) U.S. Cl.
CPC ................ *B60K 6/547* (2013.01); *B60K 6/36* (2013.01); *F16H 3/091* (2013.01); *B60K 2006/4825* (2013.01); *F16H 2200/0034* (2013.01)

(58) Field of Classification Search
CPC .. B60K 6/547; B60K 6/36; B60K 2006/4825; F16H 3/091; F16H 2200/0034
(Continued)

(56) References Cited

U.S. PATENT DOCUMENTS 8,408,342 B2 * 4/2013 Wang .................... B60W 20/00
                                                     477/3
9,222,563 B2 * 12/2015 Kaltenbach ............ B60K 6/547
(Continued)

FOREIGN PATENT DOCUMENTS

DE    102011005451 A1    9/2012
DE    102012103367 A1    10/2012
(Continued)

OTHER PUBLICATIONS

International Search Report and Written Opinion for PCT/EP2020/060530 mailed May 26, 2020 (12 pages; with English translation).

*Primary Examiner* — Ha Dinh Ho
(74) *Attorney, Agent, or Firm* — Dority & Manning, P.A.

(57) ABSTRACT

The disclosure relates to a hybrid transmission device for an internal combustion engine transmission arrangement of a motor vehicle. The hybrid transmission device comprises at least one transmission input shaft, at least one drive device and at least one connecting clutch for connecting two shafts for conjoint rotation. The hybrid transmission device com-
(Continued)

prises no more than two gear stages. The disclosure additionally relates to a motor vehicle.

19 Claims, 5 Drawing Sheets

(51) Int. Cl.
*B60K 6/48* (2007.10)
*F16H 3/091* (2006.01)

(58) Field of Classification Search
USPC .......................................................... 74/329
See application file for complete search history.

(56) References Cited

U.S. PATENT DOCUMENTS

| | | | |
|---|---|---|---|
| 9,370,993 B2* | 6/2016 | Chen | B60W 20/30 |
| 9,909,663 B2* | 3/2018 | Goeppert | F16H 57/0006 |
| 2008/0009379 A1* | 1/2008 | Steinwender | B60W 10/11 |
| | | | 903/910 |
| 2011/0073393 A1* | 3/2011 | Sasaki | F16H 61/688 |
| | | | 903/902 |
| 2014/0352492 A1* | 12/2014 | Nefcy | B60W 10/08 |
| | | | 74/7 C |
| 2017/0190246 A1* | 7/2017 | Venturi | B60K 6/547 |
| 2019/0162272 A1* | 5/2019 | Eo | B60K 6/383 |

FOREIGN PATENT DOCUMENTS

| | | | |
|---|---|---|---|
| DE | 102016111840 A1 | | 12/2016 |
| DE | 102016220511 A1 | | 4/2018 |
| DE | 102018128367 A1 | | 5/2019 |
| DE | 102021200140 A1 * | | 7/2022 |
| EP | 2405156 A1 | | 1/2012 |
| EP | 3020588 A2 | | 5/2016 |
| JP | H10217779 A | | 8/1998 |
| WO | 2018161389 A1 | | 9/2018 |
| WO | 2019019293 A1 | | 1/2019 |
| WO | WO-2020212386 A1 * | 10/2020 | ............... B60K 6/36 |

* cited by examiner

HYBRID TRANSMISSION DEVICE, ENGINE TRANSMISSION ARRANGEMENT, HYBRID DRIVETRAIN AND MOTOR VEHICLE

CROSS-REFERENCE TO RELATED APPLICATIONS

This application is a national stage of International Application No. PCT/EP2020/060530, filed Apr. 15, 2020, the disclosure of which is incorporated herein by reference in its entirety, and which claimed priority to German Patent Application No. 102019205510.9, filed Apr. 16, 2019, the disclosure of which is incorporated herein by reference in its entirety.

TECHNICAL FIELD

The disclosure relates to a hybrid transmission device having at least one transmission input shaft, at least one drive device and at least one connecting clutch for the rotationally conjoint connection of two shafts.

BACKGROUND

It is known to use hybrid transmission devices to reduce the CO2 emissions from motor vehicles. A hybrid transmission device is to be understood to mean a transmission device to which an internal combustion engine and at least one further drive device can be coupled. It is known to hybridize any automated transmission, for example automatic transmissions and dual clutch transmissions. From DE 10 2011 005 451 A1, a transmission is known which has two electric motors and which operates with 5 forward gear ratios and one reverse gear ratio.

Based on above, a hybrid transmission device is needed which is configured to be as compact as possible for front-transverse applications.

SUMMARY

It is proposed that a hybrid transmission device of the type mentioned above has at most two, and in one exemplary arrangement, exactly two, gear ratio stages.

In one exemplary arrangement, the transmission of the hybrid transmission device is advantageously configured as a gear ratio change transmission. It then has at least two discrete gear ratio stages.

In one exemplary arrangement, the gear ratio change transmission advantageously has toothed gearwheels and shift elements. In one specific exemplary arrangement, the toothed gearwheels are configured as spur gearwheels.

In one exemplary arrangement, the transmission of the hybrid transmission device is configured as a fixed-axis transmission. In fixed-axis transmissions, the axes of all toothed gearwheels in the transmission are static relative to the transmission housing.

In one exemplary arrangement, the gear ratio change transmission is configured as a transmission with a countershaft design. The gear ratio change transmission is configured as a spur-gearwheel transmission. The toothed gearwheels are then configured as spur gearwheels.

The hybrid transmission device may have at least one, and in one exemplary arrangement, exactly one, countershaft. If a single countershaft is used, it is then the case that there is a single attachment point to the differential. In this way, installation space can be saved, which is the case both in a radial and in an axial direction.

Thus, in one exemplary arrangement, the transmission has exactly two shafts, namely a transmission input shaft and a countershaft, which is then also the output shaft.

In the case of an all-wheel-drive variant of the transmission, there is always an additional shaft which, as an auxiliary drive, drives the second motor vehicle axle.

As already described above, a gear ratio stage is a transmission ratio between two shafts that is implemented mechanically by toothed gearwheels. The overall transmission ratio between the internal combustion engine or drive device and wheel has further transmission ratios, wherein the transmission ratios upstream of a gear ratio stage, the so-called upstream transmission ratios, may be dependent on the drive used. The downstream transmission ratios are commonly identical. In one exemplary arrangement shown further below, the rotational speed and the torque of a drive device are transformed several times, namely by at least one toothed gearwheel pair between the output shaft of the drive device and a transmission input shaft. This is an upstream transmission ratio. This is then followed by a toothed gearwheel pair of a gear ratio stage with a transmission ratio dependent on the gear ratio stage. This is finally followed by a toothed gearwheel pair between the countershaft and the differential as a downstream transmission ratio. A gear ratio then has an overall transmission ratio that is dependent on the drive and the gear ratio stage.

If torque is transmitted from the internal combustion engine via a gear ratio stage Ga, this is referred to as internal combustion engine gear ratio $V1$. If the drive device and the internal combustion engine transmit torque simultaneously via the gear ratio stage Ga, this is referred to as hybrid gear ratio $H11$. If only the drive device transmits torque via a gear ratio stage Gb, this is referred to as an electric gear ratio $E1$.

The transmission of the hybrid transmission device has at most two gear ratio stages or transmission ratio stages. The toothed gearwheels of a gear ratio stage may be arranged in one gearwheel plane if the gear ratio stage has two gear-ratio gearwheels, in one exemplary arrangement, a fixed gearwheel and an idler gearwheel.

In one exemplary arrangement, the transmission of the hybrid transmission device has one gearwheel plane more than it has gear ratio stages. In the case of two gear ratio stages, this means that there are three gearwheel planes. This also includes the gearwheel plane for the attachment of the output, for example of a differential.

In one exemplary arrangement, a gear ratio stage is assigned exclusively to an electric gear ratio $E1$. Furthermore, the second gear ratio stage may be assigned exclusively to an internal combustion engine gear ratio $V1$ and a hybrid gear ratio $H11$, but not to an electric gear ratio.

Advantageously, the hybrid transmission device or the transmission may be configured so as to have no reversing toothed gear for direction reversal. Accordingly, the reverse gear ratio is generated not by way of the internal combustion engine but by way of the or at least one of the drive devices.

The transmission ratio of the gear ratio stage assigned to the internal combustion engine gear ratio is advantageously lower than the gear ratio stage assigned to the electric gear ratio.

In one exemplary arrangement, a toothed gearwheel of the internal combustion engine gear ratio stage and a toothed gearwheel of the electric gear ratio stage may be arranged on the transmission input shaft from the side of the internal combustion engine.

In a first alternative arrangement, the drive device may be attached to an internal combustion engine and/or hybrid gear ratio stage. An upstream transmission ratio in relation to the electric gear ratio stage is then provided. In a second alternative arrangement, the drive device may be attached by an attachment toothed gear. This toothed gear likewise provides an upstream transmission ratio. In particular, the drive device may then be attached by a chain. In both cases, the toothed gearwheels are mounted on the transmission input shaft.

In one exemplary arrangement, the hybrid transmission device may have exactly one drive device. Here, a drive device also includes an arrangement of one or more drive devices which act on a specific point of the hybrid transmission device. This means that, for example in the case of the drive device being configured as an electric motor, multiple small electric motors are also regarded as one electric motor if they add up their torque at a single output point.

The drive device may also be configured as a generator. It is then configured both as a motor and as a generator.

At this juncture, it should be noted that, in the present disclosure, a connection or operative connection denotes any connection in terms of power flow, including via other components of the transmission. By contrast, an attachment denotes the first connection point for the transmitting of drive torque between the drive machine and the transmission.

An attachment to a gear ratio stage, that is to say of one of the gear-ratio toothed gearwheels thereof, may take place here via a toothed gearwheel. An additional intermediate gearwheel may be required to bridge the axis spacing between the output shaft of the drive device and the transmission input shaft. As a result of the attachment of the drive device to a gear-ratio toothed gearwheel, a further gearwheel plane, which would be present only for the attachment of the drive device, can be avoided.

Advantageously, in one exemplary arrangement, at least one of the gear-ratio gearwheels that are arranged on the axis of the transmission input shafts may be configured as a fixed gearwheel. Both gear-ratio gearwheels may be configured as fixed gearwheels. The drive device may thus be arranged in a so-called P3 arrangement, that is to say on the transmission gearwheel set.

The drive device may be used for electric or fluidic forward launching. Furthermore, launching may always be performed by the drive device. The drive device may be used as the sole drive source for launching. Likewise, the drive device can be used for electric or fluidic reverse travel. Here, too, it may be provided that the drive device is the sole drive source during reverse travel. There are then neither internal combustion engine nor hybrid reverse gear ratios.

In one exemplary arrangement, the drive device may be arranged axially parallel with respect to the transmission input shaft. It is then also axially parallel with respect to the countershaft. In the present disclosure, an axially parallel arrangement is not only to be understood to mean completely parallel arrangements; there may also be an inclination or an angle between the longitudinal axis of the transmission input shafts and the longitudinal axis of the electric motor. An angle between the longitudinal axis of an electric motor and the longitudinal axis of the transmission input shafts is preferably less than or equal to 10°, more preferably less than 5° and in particular 0°. Slight inclinations of the drive devices in relation to the transmission may result for structural space reasons.

Alternatively, the drive device may be arranged coaxially with respect to the transmission input shaft. Said drive device is then advantageously attached to the transmission input shaft. In the axial direction, said drive device is then situated between the connecting clutch and the first toothed gearwheel on the second transmission input shaft, that is to say axially to the outside. In particular, said drive device may lie, in the axial direction, at the same height as the gearwheel plane of the differential.

In one exemplary arrangement, in an installed position, the axis of the drive device may—in the case of an axially parallel arrangement of the drive device—lie above the axis of the transmission input shaft. The installed position will always be referenced hereinafter; during the assembly process, the hybrid transmission device may also be upside down. Such positions are however irrelevant for the following description. Whilst the axially parallel arrangement also makes it possible for the drive device to be situated below the axis of the transmission input shaft, it is advantageously provided that the drive device, and thus its axis, is positioned above the transmission input shaft. With this arrangement, the packaging density can be maximized.

In the installed position, the axis of the drive device may lie above the axes of one or more countershafts and/or of one or more output shafts. The drive device thus lies above the stated components of the spur-gearwheel transmission arrangement. Alternatively, it may accordingly be said that the axis of the drive device in the installed position has the uppermost axis of the hybrid transmission device.

In one exemplary arrangement, the drive device may be arranged, in the axial direction, at the same height as the gear ratio change transmission. The overlap in the axial direction may be more than 75%, and in one exemplary arrangement, is 100%. Here, the overlap is determined on the basis of the housing of the drive device. The output shaft of the drive device is not taken into consideration.

The second drive device may be rotationally conjointly connected to the transmission input shaft, in particular attached to the transmission input shaft.

The transmission input shaft may advantageously be connectable or connected directly to an internal combustion engine. Directly connected refers to a clutch-free connection; a damping device may for example be present between the crankshaft and the first transmission input shaft. The damping device may have a torsion damper and/or an absorber and/or a slip clutch. The torsion damper may be configured as a dual-mass flywheel. The absorber may be configured as a rotational-speed-adaptive absorber.

In one exemplary arrangement, the drive device may be configured as an electric motor. Electric motors are widely used in hybrid transmission devices.

Alternatively or additionally, the drive device may be configured as a fluidic prime mover. In addition to electric motors, there are other prime movers that may conceivably be used in hybrid transmission devices. These can likewise be operated as a motor, that is to say with consumption of energy, or as a generator, that is to say with conversion of energy. In the case of a fluidic prime mover, the energy store is for example a pressure store. The energy conversion then includes in the conversion of the energy from the internal combustion engine into a build-up of pressure.

The drive device may be used as an electric motor in order, in generator operation, to charge a battery by which the electric axle is supplied with energy. Furthermore, a supply may be provided to the electric axle directly by way of the combustion engine-generator combination.

In this way, the motor vehicle can for example be driven exclusively electrically throughout large speed ranges.

The connecting clutch serves for the coupling of the internal combustion engine to the transmission. It is therefore a so-called separating clutch. Purely electric driving is thus also possible by the drive device.

The connecting clutch may be arranged at that end of the transmission input shaft which points toward the internal combustion engine.

In the present disclosure, a shift device is to be understood to mean an arrangement with one or two shift elements. The shift device is then of one-sided or two-sided configuration. A shift element may be a clutch or a shift clutch. A clutch serves for the rotationally conjoint connection of two shafts and a shift clutch serves for the rotationally conjoint connection of a shaft to a hub, for example an idler gearwheel, mounted rotatably thereon. The connecting clutch may be configured in the manner of a shift clutch and is designated a clutch solely because it connects two shafts to one another.

At least some of the clutches and/or shift clutches may be configured as dog clutches. In particular, all clutches and shift clutches may be configured as dog clutches.

In a first exemplary arrangement, the first transmission input shaft is configured so as to have no shift clutch and/or no idler gearwheel. Here, it may be the case that exclusively fixed gearwheels are arranged as toothed gearwheels on the first transmission input shaft. In one particular example, exactly two fixed gearwheels may be arranged on the first transmission input shaft.

Alternatively, it may be the case that exclusively idler gearwheels are arranged as toothed gearwheels on the first transmission input shaft. In particular, exactly two idler gearwheels may be arranged on the first transmission input shaft. At least one shift device may then be arranged on the first transmission input shaft. At least two, and in one particular arrangement, exactly two, shift devices may be arranged on the first transmission input shaft. A one-sided and a two-sided shift device may be provided.

Advantageously, each gear ratio stage may be assigned a fixed gearwheel and an idler gearwheel, specifically in each case a single fixed gearwheel and a single idler gearwheel. Furthermore, each fixed gearwheel and idler gearwheel may always be uniquely assigned to a single gear ratio stage.

In one exemplary arrangement, a differential may be arranged, in the axial direction, at the height of a clutch for connecting a crankshaft and the transmission input shaft. A toothed gearwheel for the attachment of the differential may advantageously be arranged axially at the outside on a countershaft. The attachment may be implemented at the side of the internal combustion engine.

The hybrid transmission device may have at least one, and in one exemplary arrangement, exactly one, countershaft. If a single countershaft is used, it is then the case that there is a single attachment point to the differential. In this way, installation space can be saved, which is the case both in a radial and in an axial direction.

At least one shift device may be arranged on the countershaft. In a first alternative, exactly one shift device may be arranged on the countershaft. In one exemplary arrangement, exactly two idler gearwheels are then arranged on the countershaft. In particular, the countershaft may be configured without a gear-ratio fixed gearwheel.

Alternatively, in one exemplary arrangement, it may be the case that exclusively fixed gearwheels are arranged on the countershaft, in particular two gear-ratio fixed gearwheels and/or one fixed gearwheel for producing a connection to the differential.

In one exemplary arrangement, all of the shift elements of the shift devices on the countershaft may be configured as shift clutches.

A fixed gearwheel for producing a connection to the differential may be situated on the countershaft.

Furthermore, the hybrid transmission device may have a control device. This is configured to control the transmission as described.

In addition, the disclosure relates to a hybrid drivetrain having a hybrid transmission device and at least one electric axle, in particular rear axle. The hybrid drivetrain is distinguished by the fact that the hybrid transmission device is configured as described. In one exemplary arrangement, this construction is arranged with a single drive device in the hybrid transmission device. An electric axle is in this case an axle with an electric motor assigned thereto. The output of drive torque by the electric motor of the electric axle thus takes place in the power flow independently of the hybrid transmission device. In one exemplary arrangement, the electric axle is an assembly unit. The assembly unit may also have a dedicated transmission for the transformation of the drive torque of the electric motor of the electric axle. In one exemplary arrangement, said transmission is configured as a gear ratio change transmission.

If an electric axle is used, this arrangement can support the drive torque when the drive device or the internal combustion engine changes gear ratio stage. In one exemplary arrangement, the hybrid transmission device is assigned to an axle other than the electric axle.

In addition, the disclosure relates to a motor vehicle having an internal combustion engine and a hybrid transmission device or a hybrid drivetrain. The motor vehicle is distinguished by the fact that the hybrid transmission device or the hybrid drivetrain is configured as described.

In one exemplary arrangement, the hybrid transmission device is advantageously arranged as a front-transverse transmission device in the motor vehicle.

In one exemplary arrangement, the motor vehicle has a control device for controlling the hybrid transmission device. The control device may thus be part of the hybrid transmission device, but this is not imperatively the case.

A battery is arranged in the motor vehicle, which battery allows the motor vehicle to be operated electrically for at least 15 minutes. Alternatively, for purely electric operation, the internal combustion engine may use one of the electric motors as a generator to generate electricity that goes directly to the other electric motor.

Furthermore, the motor vehicle may have a pressure store. This can be used for the operation of a fluidic prime mover.

BRIEF DESCRIPTION OF DRAWINGS

Further advantages, features and details of the disclosure will emerge from the following description of exemplary embodiments and figures. In the figures.

DETAILED DESCRIPTION

Figure 1:
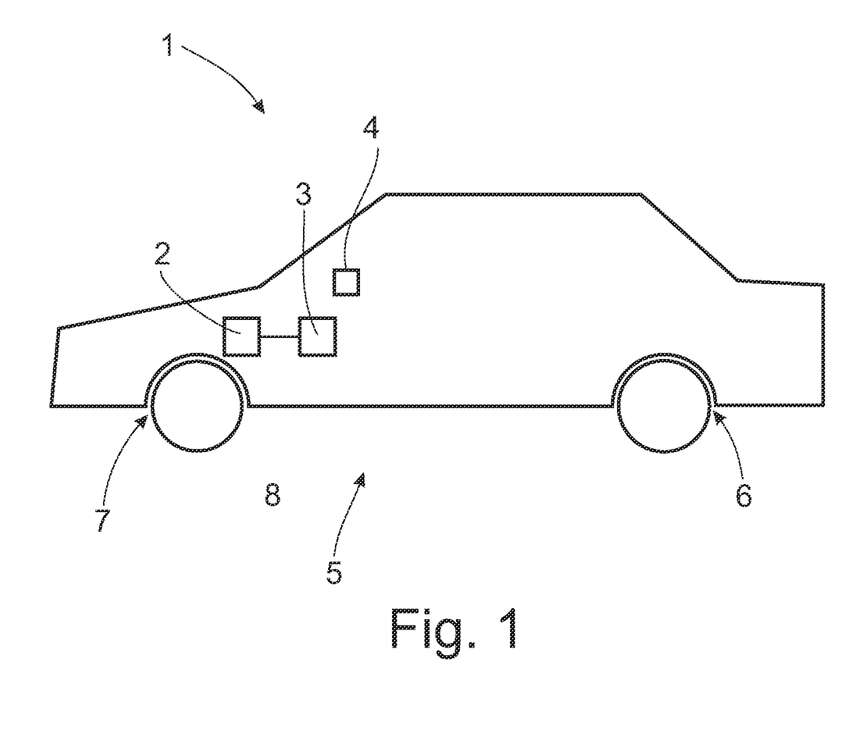
FIG. 1 shows a motor vehicle.

FIG. 1 shows a motor vehicle 1 having an internal combustion engine 2 and a hybrid transmission device 3. As will be described in more detail further below, the hybrid transmission device 3 also comprises an electric motor EM2, such that it can be installed as an assembly unit. This is however not imperative; in principle, the gearwheel set may also form an assembly unit without an electric motor EM2 already connected. A control device 4 is provided for controlling the hybrid transmission device 3. This may be part of the hybrid transmission device 3 or of the motor vehicle 1.

In addition to the internal combustion engine 2 and the hybrid transmission device 3, the hybrid drivetrain 5 may also have at least one electric axle 6. In one exemplary arrangement, the electric axle 6 is the rear axle if the hybrid transmission device 3 is arranged as a front transverse transmission and drives the front axle 7, and vice versa.

Here, the internal combustion engine 2 and the hybrid transmission device 3 form an internal combustion engine-transmission arrangement 8. By contrast to transmissions for a single drive device, for example only for an internal combustion engine or only for an electric motor, the hybrid transmission device is configured for the attachment of at least two drive devices with different forms of energy conversion or consumption.

Figure 2:
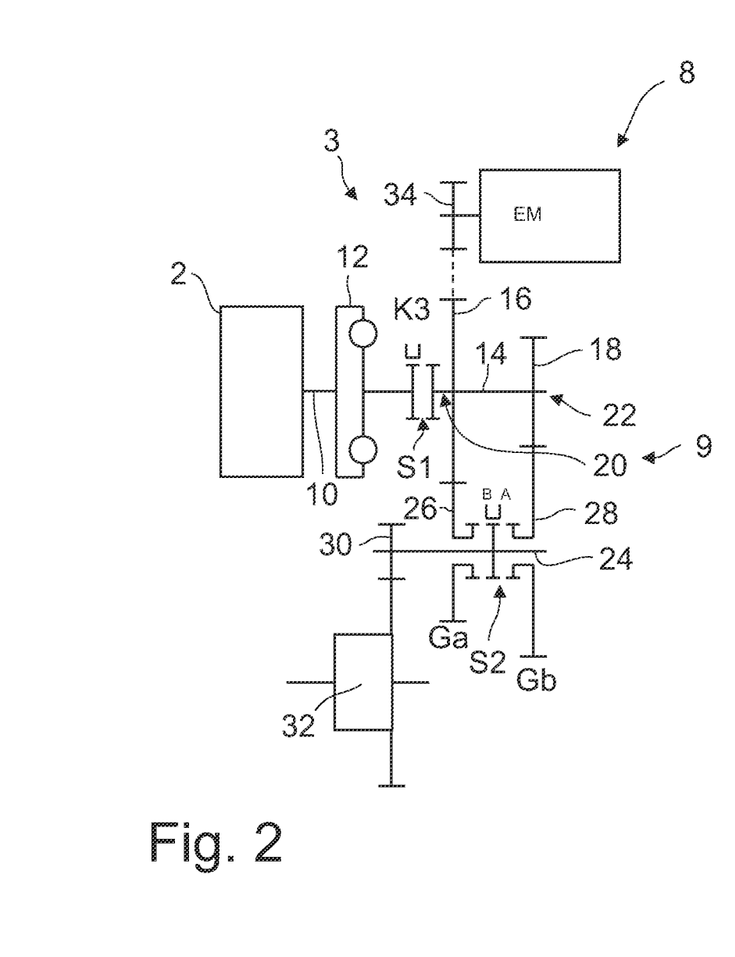
FIG. 2 shows an internal combustion engine-transmission arrangement in a first exemplary arrangement.

FIG. 2 shows the internal combustion engine-transmission arrangement 8 having the internal combustion engine 2 and the hybrid transmission device 3, and in particular the transmission 9 thereof, in the form of a gearwheel set diagram in a first exemplary arrangement. The internal combustion engine-transmission arrangement 8 is described below, starting with the internal combustion engine 2. The crankshaft 10 is connected to the transmission input shaft 14 via a damping device 12. The damping device 12 may comprise a torsion damper and/or absorber and/or a slip clutch. For the connection of the crankshaft 10 to the transmission input shaft 14, a connecting clutch K3 is provided as shift device S1. This is arranged on the side of the internal combustion engine 2.

Two fixed gearwheels 16 and 18 are arranged on the transmission input shaft 14. Here, the fixed gearwheel 16 is the fixed gearwheel of gear ratio stage Ga and the fixed gearwheel 18 is the fixed gearwheel of gear ratio stage Gb.

The transmission input shaft 14 has two ends, namely an end 20 pointing toward the internal combustion engine 2 and an end 22 at the side averted from the engine.

The clutch K3 connects the internal combustion engine 2 to the hybrid transmission device 3. The connecting clutch K3 may be entirely or partially pre-installed on the hybrid transmission device 3 before the process of assembly with the internal combustion engine 2.

The hybrid transmission device 3 has a single countershaft 24 for connection to a differential 32 and for forming the transmission ratio or gear ratio stages. A single shift device S2 with shift clutches A and B for connecting the idler gearwheels 26 and 28 to the countershaft 24 is arranged on the countershaft 24. The countershaft 24 is configured without a gear-ratio fixed gearwheel, that is to say there is no fixed gearwheel of a gear ratio stage situated on said countershaft. Only one fixed gearwheel 30 for the attachment of the differential 32 is provided as a fixed gearwheel on the countershaft 24. The assignment of the fixed gearwheels and idler gearwheels to the gear ratio stages is apparent from the gear ratio stage names Ga and Gb below the toothed gearwheels arranged on the countershaft 24.

Here, the gear ratio stage Ga with the toothed gearwheels 16 and 26 is always used in conjunction with the internal combustion engine 2, either for an internal combustion engine gear ratio V1 or for a hybrid gear ratio H11. By contrast, the gear ratio stage Gb with the toothed gearwheels 18 and 28 is driven and used purely electrically, that is to say by the electric motor EM.

In the exemplary arrangement as per FIG. 2, the electric motor EM is connected to the gear ratio stage Ga of the internal combustion engine 2 in order to utilize this for an upstream transmission ratio in a purely electric operating mode. Whereas the gear ratio stage Ga provides a step-up transformation, that is to say has a transmission ratio of less than 1, a total transmission ratio of approximately 15 is required for the electric motor EM. The gear ratio stage Gb contributes a factor of approximately 2.5 for this purpose. The fixed gearwheel 16 of the gear ratio stage Ga is used for attachment and for an upstream transmission ratio, wherein a transmission ratio of approximately 2 is attained between electric motor EM and transmission input shaft 14. In this way, an optimum transmission ratio can be obtained for each drive device with minimal outlay.

Based on this diagram, the following can be stated with regard to the gear ratio stages: Each gear ratio stage Ga and Gb is assigned a fixed gearwheel and an idler gearwheel, specifically in each case a single fixed gearwheel and a single idler gearwheel. Each fixed gearwheel and idler gearwheel is always uniquely assigned to a single gear ratio stage, that is to say there are no winding-path gear ratios using a toothed gearwheel of several gear ratio stages.

By contrast, one gear ratio also comprises the upstream transmission ratios and downstream transmission ratios. In the electric motor gear ratio E1, the transmission ratio attained by way of the toothed gearwheels 16 and 34 is thus also realized as an upstream transmission ratio. Here, a further toothed gearwheel may be arranged between the toothed gearwheels 16 and 34 in order to achieve the desired transmission ratio and/or to bridge the spacing.

The electric motor EM is attached as shown, specifically to the toothed gearwheel 16. This makes it possible to attach the electric motor EM to the transmission input shaft for 14 without an additional toothed gear, which saves structural space. In particular, as a result of the attachment of the electric motor EM with an overlap of the electric motor 2 and the transmission 9 in the axial direction, an axially extremely short hybrid transmission device 3 can be created.

The electric motor EM or its longitudinal axis is arranged parallel to the transmission input shaft 14.

Figure 3:
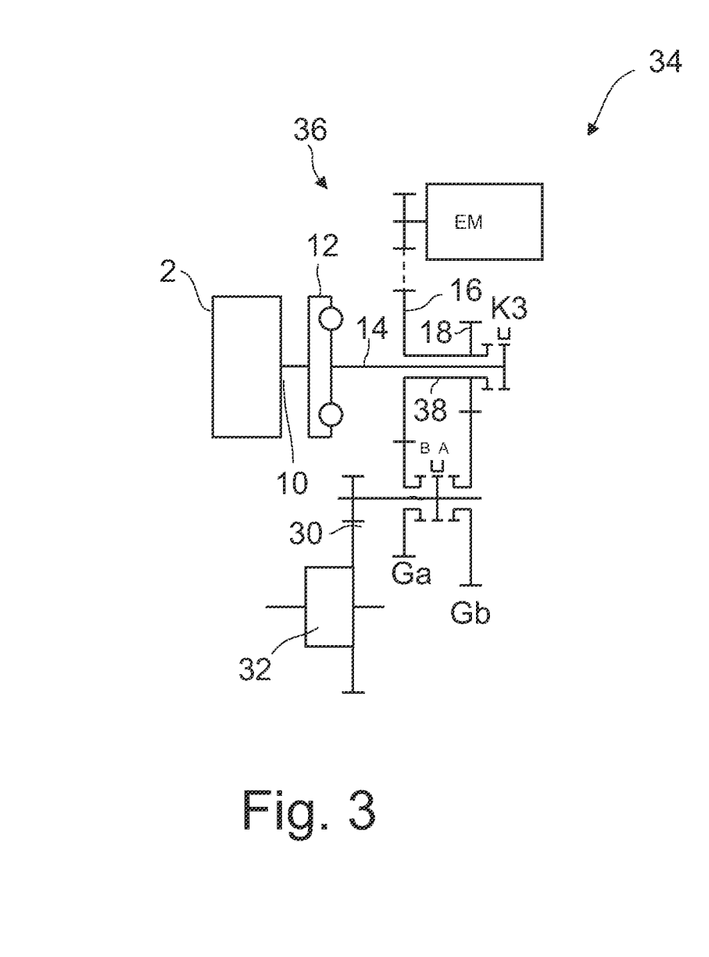
FIG. 3 shows an internal combustion engine-transmission arrangement in a second exemplary arrangement.

FIG. 3 shows a second exemplary arrangement of an internal combustion engine-transmission arrangement 34. This likewise comprises an internal combustion engine 2 and a hybrid transmission device 36. By contrast to the arrangement as per FIG. 2, the connecting clutch K3 is arranged at that end 22 of the transmission input shaft which is averted from the engine. For the separation of the internal combustion engine 2 from the electric motor EM or from the further torque transmission, an intermediate shaft 38 is provided, which is mounted on the transmission input shaft 14. The connecting clutch K3 then connects the transmission input shaft 14 and the intermediate shaft 38.

The further construction and the mode of operation are apparent from FIG. 2. In particular, the described functionality is also retained.

Figure 4:
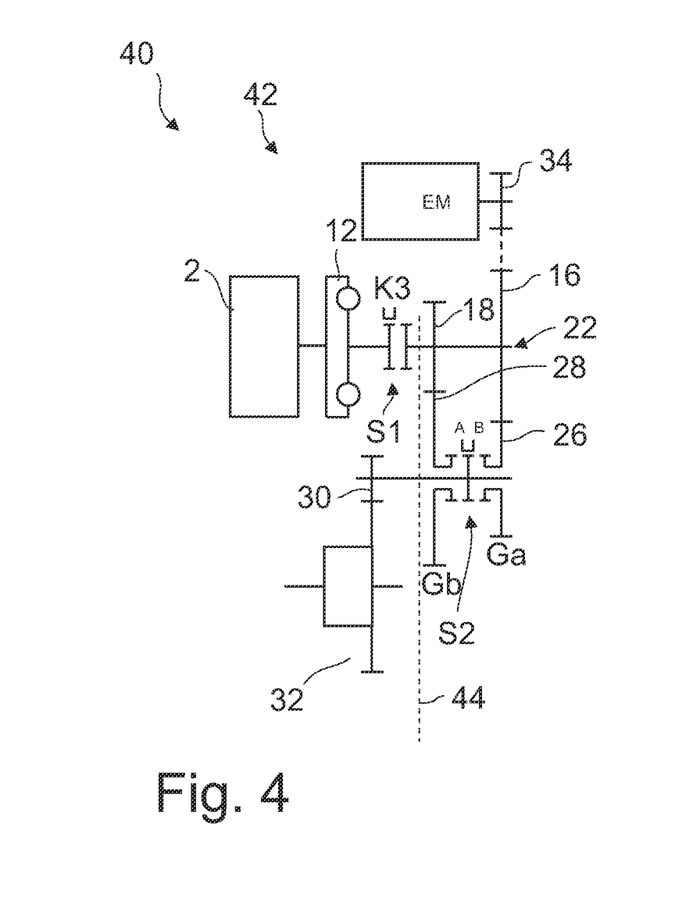
FIG. 4 shows an internal combustion engine-transmission arrangement in a third exemplary arrangement.

FIG. 4 shows a third exemplary arrangement of an internal combustion engine-transmission arrangement 40. This likewise comprises an internal combustion engine 2 and a hybrid transmission device 42. The hybrid transmission device 42 differs from the hybrid transmission device 3 as per FIG. 2 in that the sections behind the axis 44 have been mirror-inverted in the axial direction. The gear ratio stage Ga is accordingly situated at that end 22 of the transmission input shaft 14 which is averted from the engine, whereas the gear ratio stage Gb with the toothed gearwheels 18 and 28 is now closer to the internal combustion engine 2. The electric motor EM has likewise been mirror-inverted in terms of its position and location.

Figure 5:
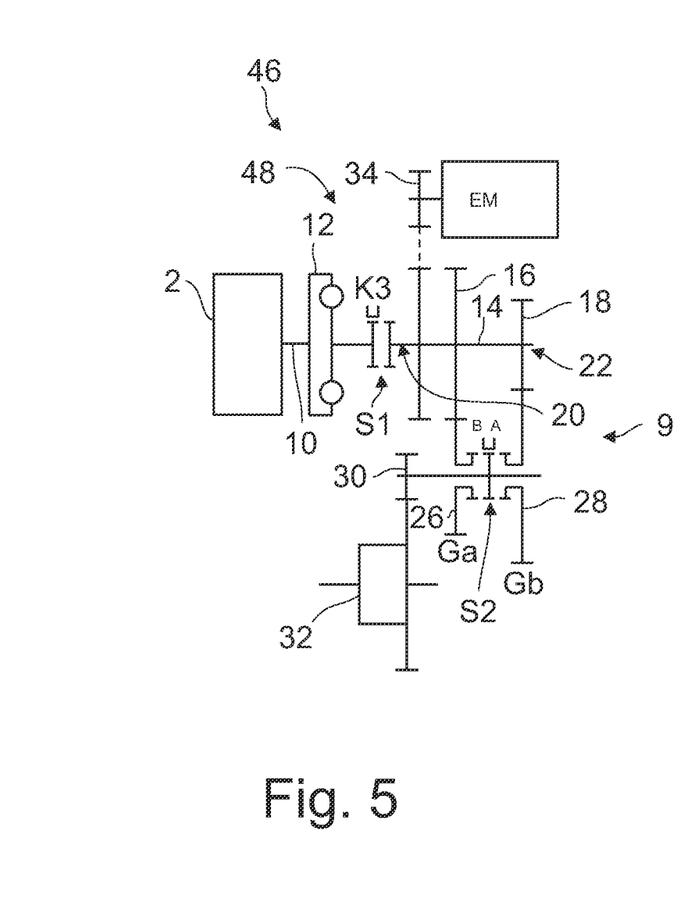
FIG. 5 shows an internal combustion engine-transmission arrangement in a fourth exemplary arrangement.

FIG. 5 shows a fourth exemplary arrangement of an internal combustion engine-transmission arrangement 46. This likewise comprises an internal combustion engine 2 and a hybrid transmission device 48. The hybrid transmission device 48 differs from the hybrid transmission device 3 as per FIG. 2 in that, for the attachment of the electric motor EM, a dedicated toothed gearwheel 50 is arranged on the transmission input shaft 14. The toothed gearwheel 50 is preferably configured as a fixed gearwheel. Through the use of a dedicated toothed gearwheel 50 instead of the gear-ratio fixed gearwheel 16, the electric motor EM can be attached by a chain. The dimensioning may be implemented as in the case of the toothed gearwheel 16, though it may also differ.

In the exemplary arrangement as per FIG. 5, the toothed gear is arranged on the motor-side end 20 of the transmission input shaft 14.

Figure 6:
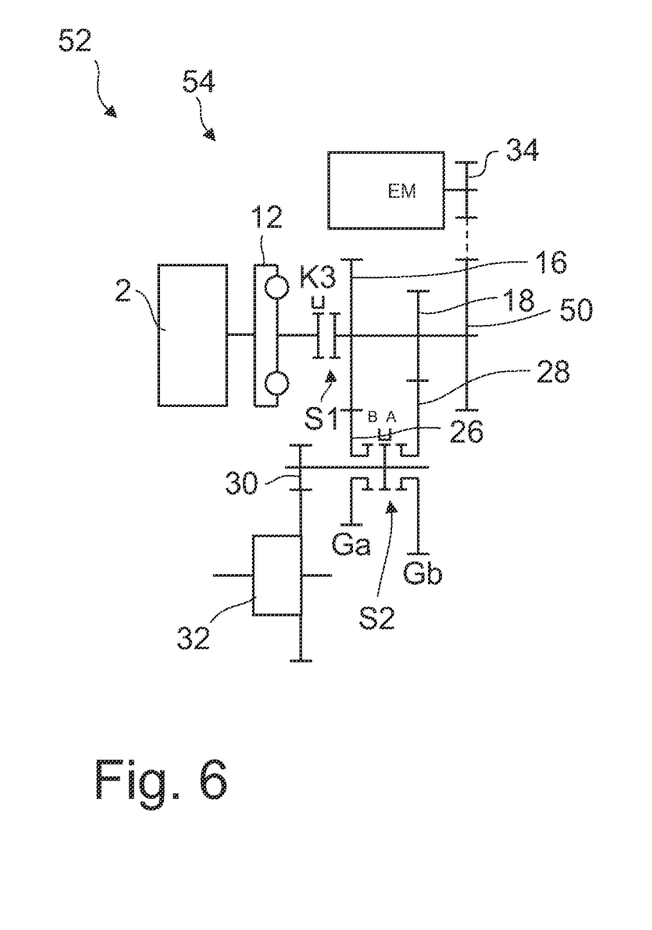
FIG. 6 shows an internal combustion engine-transmission arrangement in a fifth exemplary arrangement.

FIG. 6 shows a fifth exemplary arrangement of an internal combustion engine-transmission arrangement 52. This likewise comprises an internal combustion engine 2 and a hybrid transmission device 54. The hybrid transmission device 54 differs from the hybrid transmission device 3 as per FIG. 2 in that, for the attachment of the electric motor EM, a dedicated toothed gearwheel 50 is arranged on the transmission input shaft 14. In relation to FIG. 5, however, an alternative attachment point for the toothed gear 50 has been selected. This is now arranged at that end 22 which is averted from the motor, and the output of the electric motor EM has therefore been reversed in the axial direction.

Figure 7:
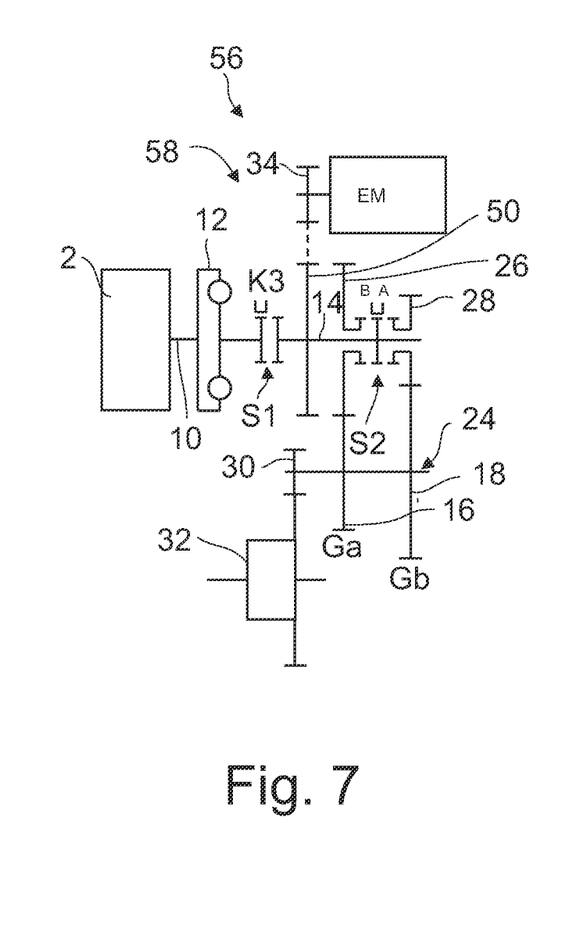
FIG. 7 shows an internal combustion engine-transmission arrangement in a sixth exemplary arrangement.

FIG. 7 shows a sixth exemplary arrangement of an internal combustion engine-transmission arrangement 56. This likewise comprises an internal combustion engine 2 and a hybrid transmission device 58. The hybrid transmission device 58 differs from the hybrid transmission device 3 as per FIG. 2 in that the shift device S2 has been relocated to the transmission input shaft 14. Accordingly, the idler gearwheels 26 and 28 of the gear ratio stages Ga and Gb are arranged on the transmission input shaft 14 and the fixed gearwheels 16 and 18 are arranged on the countershaft 24. Furthermore, the electric motor EM is attached to a separate toothed gearwheel 50, which is not a gear-ratio toothed gearwheel.

Figure 8:
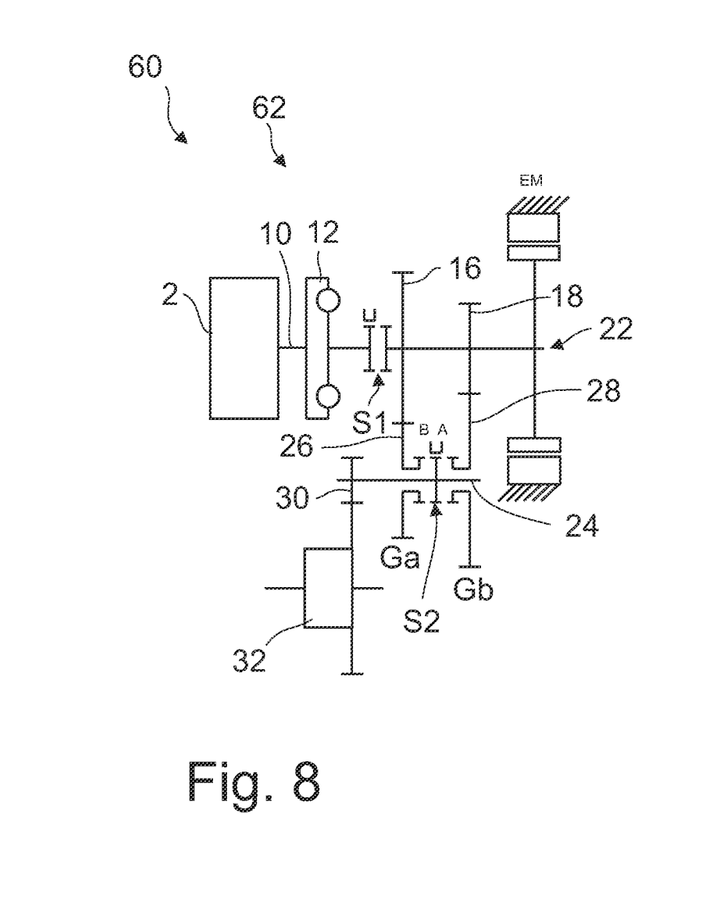
FIG. 8 shows an internal combustion engine-transmission arrangement in a seventh exemplary arrangement.

FIG. 8 shows a seventh exemplary arrangement of an internal combustion engine-transmission arrangement 60. This likewise comprises an internal combustion engine 2 and a hybrid transmission device 62. The hybrid transmission device 62 differs from the hybrid transmission device 3 as per FIG. 2 in that the electric motor EM is arranged coaxially with respect to the transmission input shaft 14 and is attached directly thereto. In the exemplary arrangement as per FIG. 7, said electric motor is attached to the end 22 averted from the engine.

Figure 9:
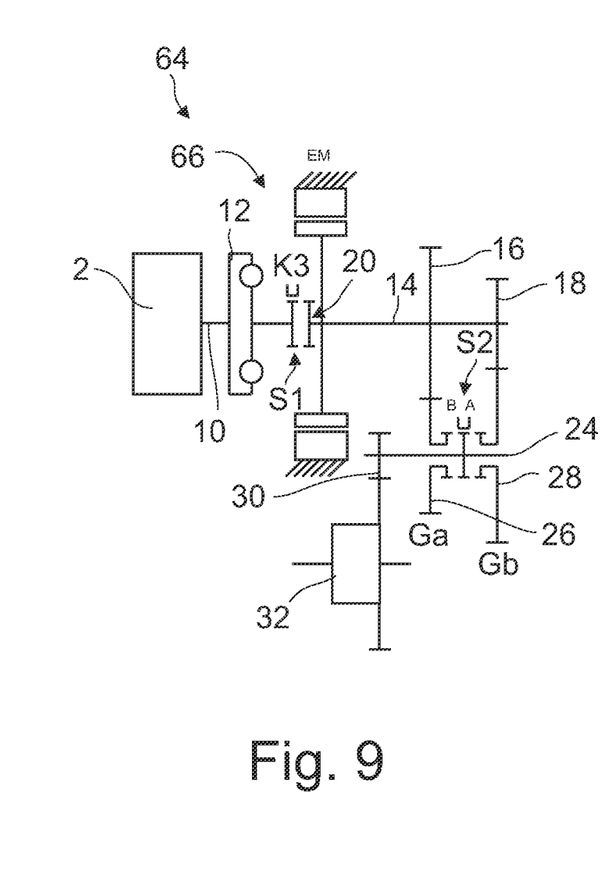
FIG. 9 shows an internal combustion engine-transmission arrangement in an eighth exemplary arrangement.

FIG. 9 shows an eighth exemplary arrangement of an internal combustion engine-transmission arrangement 64. This likewise comprises an internal combustion engine 2 and a hybrid transmission device 66. The hybrid transmission device 64 differs from the hybrid transmission device 3 as per FIG. 2 in that the electric motor EM is arranged coaxially with respect to the transmission input shaft 14 and is attached directly thereto. By contrast to the arrangement as per FIG. 8, said electric motor is attached to that end 20 of the transmission input shaft 14 which faces toward the engine.

The hybrid transmission devices 3, 36, 42, 48, 54, 58, 62 and 66 have the following features in common;

The hybrid transmission devices 3, 36, 42, 48, 54, 58, 62 and 66 have only two gear ratio stages, specifically an electric motor gear ratio stage Gb and a gear ratio stage Ga which is always operated with an internal combustion engine, be it an internal combustion engine on its own or as part of a hybrid. The transmission ratio of the gear ratio stage Ga is less than 1 and the transmission ratio of gear ratio stage Gb is greater than 1. The internal combustion engine 2 can be coupled in by a connecting clutch. The gear ratio stages Ga and Gb are engageable by a single shift device S2. There is a single countershaft 22. A damping device 12 is provided for reducing vibrations. The electric motor EM is connected to the transmission input shaft.

These are in each case preferred developments of the core of the disclosure, and it is for example self-evidently also possible for each idler gearwheel to be assigned a dedicated one-sided shift device with a single shift clutch.

The invention claimed is:

1. A hybrid transmission device for an internal combustion engine-transmission arrangement of a motor vehicle, comprising
   at least one transmission input shaft,
   exactly one drive device; and
   at least one connecting clutch for the rotationally conjoint connection of the transmission input shaft with a crankshaft of the internal combustion engine,
   wherein the hybrid transmission device has exactly two gear ratio stages, a first gear ratio stage and a second gear ratio stage;
   wherein the first gear ratio stage is always used in conjunction with the internal combustion engine, either for an internal combustion engine gear ratio or for a hybrid gear ratio;
   wherein the second gear ratio stage is driven solely by the one drive device;
   wherein the first gear ratio stage has a transmission ratio of less than 1; and
   wherein the second gear ratio stage has a transmission ratio greater than 1.

2. The hybrid transmission device as claimed in claim 1, wherein a damping device is arranged on an input side of the transmission input shaft.

3. The hybrid transmission device as claimed in claim 1, wherein the hybrid transmission device has exactly two shift devices.

4. The hybrid transmission device as claimed in claim 1, wherein the connecting clutch is arranged as a single shift element.

5. The hybrid transmission device as claimed in claim 1, wherein the at least one connecting clutch comprises a dog clutch.

6. The hybrid transmission device as claimed in claim 1, wherein the hybrid transmission device has exactly one two-sided shift device for connecting idler gearwheels to a shaft.

7. The hybrid transmission device as claimed in claim 1, wherein the hybrid transmission device has at most two idler gearwheels.

8. The hybrid transmission device as claimed in claim 1, wherein the transmission input shaft is configured without a shift clutch.

9. The hybrid transmission device as claimed in claim 1, wherein the hybrid transmission device has at least one countershaft.

10. The hybrid transmission device as claimed in claim 9, wherein exactly one shift device is arranged on the countershaft.

11. The hybrid transmission device as claimed in claim 9, wherein the transmission input shaft is connected or connectable directly to a crankshaft of the internal combustion engine via a damping device.

12. The hybrid transmission device as claimed in claim 3, wherein the connecting clutch is arranged as a single shift element.

13. The hybrid transmission device as claimed in claim 2, wherein the damping device may comprise a torsion damper, absorber, or a slip clutch.

14. The hybrid transmission device as claimed in claim 1, wherein two fixed gearwheels are arranged on the transmission input shaft.

15. The hybrid transmission device as claimed in claim 6, wherein the shift device includes first and second shift clutches for connecting idler gearwheels to a countershaft.

16. The hybrid transmission device as claimed in claim 15, wherein the countershaft is configured without a gear-ratio fixed gearwheel.

17. The hybrid transmission device as claimed in claim 1, wherein an axis of the at least one drive device is disposed above an axis of the at least one transmission input shaft.

18. The hybrid transmission device as claimed in 1, wherein and the transmission ratio of the second gear ratio stage comprises a transmission ratio of at least 2.5.

19. A hybrid drivetrain having a hybrid transmission device and/or an internal combustion engine-transmission arrangement, wherein the hybrid transmission device is configured as claimed in claim 1.

* * * * *